United States Patent
Nishihara et al.

(10) Patent No.: US 11,240,245 B2
(45) Date of Patent: Feb. 1, 2022

(54) COMPUTER SYSTEM

(71) Applicant: HITACHI, LTD., Tokyo (JP)

(72) Inventors: Shin Nishihara, Tokyo (JP); Tomohiro Morimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 231 days.

(21) Appl. No.: 16/561,833

(22) Filed: Sep. 5, 2019

(65) Prior Publication Data
US 2020/0195648 A1 Jun. 18, 2020

(30) Foreign Application Priority Data
Dec. 14, 2018 (JP) .............................. JP2018-234063

(51) Int. Cl.
*G06F 13/00* (2006.01)
*H04L 29/06* (2006.01)
*H04L 12/24* (2006.01)
*H04L 29/08* (2006.01)

(52) U.S. Cl.
CPC .............. *H04L 63/10* (2013.01); *H04L 41/06* (2013.01); *H04L 63/20* (2013.01); *H04L 67/1002* (2013.01)

(58) Field of Classification Search
CPC ..... H04L 63/10; H04L 41/06; H04L 67/1002; H04L 63/20; H04L 63/102; H04L 67/1004; H04L 43/16; H04L 43/0876; H04L 41/147
USPC ............... 709/226, 229, 225, 203, 224, 223; 718/105, 104, 102
See application file for complete search history.

(56) References Cited

U.S. PATENT DOCUMENTS

| | | | |
|---|---|---|---|
| 10,104,166 B2 * | 10/2018 | Chauhan | ............. H04L 12/6418 |
| 10,445,754 B2 * | 10/2019 | Snider | ..................... H04W 4/02 |
| 11,005,919 B2 * | 5/2021 | Chauhan | ................ H04L 67/42 |
| 2007/0033358 A1 | 2/2007 | Sekine et al. | |

(Continued)

FOREIGN PATENT DOCUMENTS

| | | |
|---|---|---|
| JP | 2003-330802 A | 11/2003 |
| JP | 2007-041974 A | 2/2007 |
| JP | 2018-093281 A | 6/2018 |

OTHER PUBLICATIONS

Japanese Office Action dated Sep. 15, 2020 for Japanese Patent Application No. 2018-234063.

*Primary Examiner* — Kenneth R Coulter
(74) *Attorney, Agent, or Firm* — Volpe Koenig

(57) ABSTRACT

A computer system includes one or more storage devices, and one or more processors. The one or more storage devices store permission management information specifying relations between combinations of an information source and an information type and whether sending information from the information source to an external network system is permitted or prohibited. The one or more processor is configured to receive an information transmission request specifying an information type of first information from a first system of an information source, determine whether sending the first information to outside a network system the first system belongs to is permitted with reference to the permission management information, and select a monitoring/analysis server to receive the first information from the monitoring/ analysis servers based on the determination.

10 Claims, 23 Drawing Sheets

(56) References Cited

U.S. PATENT DOCUMENTS

2015/0341428 A1\* 11/2015 Chauhan ................. H04L 67/42
                                                        709/203
2017/0076306 A1\*  3/2017 Snider .................. H04W 4/029
2019/0028536 A1\*  1/2019 Chauhan ................. H04L 69/16

\* cited by examiner

| INFORMATION SOURCE | | INFORMATION TYPE | INFORMATION RECIPIENT | | |
|---|---|---|---|---|---|
| DATA CENTER | REGION | | MONITORING AND ANALYSIS CENTER | SERVER IDENTIFIER | REGION |
| DC-A1 | R-A | EVENT/FAILURE INFORMATION | MA-A1 | 111111 | R-A |
| DC-A1 | R-A | SPECIFICS/ CONFIGURATION INFORMATION | MA-A1 | 000111 | R-A |
| ... | ... | ... | ... | ... | |
| DC-B1 | R-B | EVENT/FAILURE INFORMATION | MA-B1 | 111111 | R-B |
| DC-B1 | R-B | SPECIFICS/ CONFIGURATION INFORMATION | MA-B1 | 111222 | R-B |
| ... | ... | ... | ... | ... | |

DEFAULT INFORMATION RECIPIENT MANAGEMENT TABLE

*FIG. 3*

| INFORMATION SOURCE | PRIORITY LEVEL (SMALLER NUMBER REPRESENTS HIGHER LEVEL) |
|---|---|
| DC-A1 | 1 |
| ... | ... |
| DC-B1 | 2 |
| ... | ... |

PRIORITY MANAGEMENT TABLE

*FIG. 4*

RESOURCE USAGE THRESHOLD MANAGEMENT TABLE

| INFORMATION SOURCE | INFORMATION TYPE | PATTERN EXPECTED TO CAUSE THRESHOLD EXCEEDANCE | | | |
|---|---|---|---|---|---|
| | | INFORMATION SIZE | TIME OF INFORMATION GENERATION | CAPACITY USAGE (MONITORING SERVER) | CPU USAGE (ANALYSIS SERVER) |
| DC-A1 | EVENT/FAILURE INFORMATION | S0[GB] | - | T00% OR MORE | - |
| DC-A1 | EVENT/FAILURE INFORMATION | - | MONDAY, 00:00-01:00 | T01% OR MORE | - |
| DC-A1 | SPECIFICS/ CONFIGURATION INFORMATION | S1[GB] | - | - | T10% OR MORE |
| DC-A1 | SPECIFICS/ CONFIGURATION INFORMATION | - | TUESDAY, 10:00-10:30 | - | T11% OR MORE |
| ... | ... | ... | ... | ... | ... |
| DC-B1 | EVENT/FAILURE INFORMATION | S0[GB] | - | T00% OR MORE | - |
| DC-B1 | EVENT/FAILURE INFORMATION | - | WEDNESDAY, 00:00-00:30 | T01% OR MORE | - |
| DC-B1 | SPECIFICS/ CONFIGURATION INFORMATION | S1[GB] | - | - | T10% OR MORE |
| DC-B1 | SPECIFICS/ CONFIGURATION INFORMATION | - | THURSDAY, 10:00-11:00 | - | T11% OR MORE |
| ... | ... | ... | ... | ... | ... |

EXPECTED THRESHOLD EXCEEDANCE PATTERN MANAGEMENT TABLE

*FIG. 6*

| INFORMATION SOURCE | GLOBAL DATA FLAG | | | |
|---|---|---|---|---|
| | APPARATUS EVENT INFORMATION | APPARATUS FAILURE INFORMATION | APPARATUS SPECIFICS INFORMATION | APPARATUS CONFIGURATION INFORMATION |
| DC-A1 | POSSIBLE | POSSIBLE | IMPOSSIBLE | IMPOSSIBLE |
| ... | ... | ... | ... | ... |
| DC-B1 | POSSIBLE | POSSIBLE | CONDITIONAL | CONDITIONAL |
| ... | ... | ... | ... | ... |

165

GLOBAL DATA FLAG MANAGEMENT TABLE

*FIG. 7*

| INFORMATION SOURCE | CONDITION WHEN ASSIGNED GLOBAL DATA FLAG IS "CONDITIONAL" |
|---|---|
| DC-A1 | ENCRYPT DATA USING KNOWN ENCRYPTION SCHEME (A) |
| ... | ... |
| DC-B1 | ENCRYPT DATA USING KNOWN ENCRYPTION SCHEME (B) |
| ... | ... |

CONDITION MANAGEMENT TABLE

*FIG. 8*

| FAILURE EVENT | RELEVANT APPARATUS EVENT INFORMATION | RELEVANT APPARATUS FAILURE INFORMATION | PRESUMED CAUSE |
|---|---|---|---|
| A | A01 | A10 | αA |
|   | A02 | A20 | βA |
| B | B01 | B10 | αB |

PRESUMED FAILURE CAUSE MANAGEMENT TABLE

*FIG. 9*

| INFORMATION SOURCE | GLOBAL DATA FLAG STATUS | GUIDANCE INFORMATION |
|---|---|---|
| DC-A1 | DATA ASSIGNED "IMPOSSIBLE" IS INCLUDED | "NOTIFY OPERATOR OF PERTINENT REGION" * HYPERLINKED |
| DC-A1 | DATA ASSIGNED "CONDITIONAL" IS INCLUDED | REQUIRED TO DECRYPT DATA WITH DECRYPTION SCHEME (A) |
| ... | ... | ... |
| DC-B1 | DATA ASSIGNED "IMPOSSIBLE" IS INCLUDED | "NOTIFY OPERATOR OF PERTINENT REGION" * HYPERLINKED |
| DC-B1 | DATA ASSIGNED "CONDITIONAL" IS INCLUDED | REQUIRED TO DECRYPT DATA WITH DECRYPTION SCHEME (B) |
| ... | ... | ... |

GUIDANCE MANAGEMENT TABLE

| MONITORING AND ANALYSIS CENTER | SERVER IDENTIFIER | ACTUAL VALUES | |
|---|---|---|---|
| | | CPU USAGE (ANALYSIS SERVER)/CAPACITY USAGE (MONITORING SERVER) | BANDWIDTH USAGE |
| MA-A1 | 000000 (MONITORING SERVER) | P00% | P01% |
| MA-A1 | 000111 (ANALYSIS SERVER) | P10% | P11% |
| ... | ... | ... | ... |
| MA-B1 | 111111 (MONITORING SERVER) | Q00% | Q01% |
| MA-B1 | 111222 (ANALYSIS SERVER) | Q10% | Q11% |
| ... | ... | ... | ... |

RESOURCE USAGE MANAGEMENT TABLE

| INFORMATION SOURCE | INFORMATION TYPE | INFORMATION RECIPIENT | |
|---|---|---|---|
| | | MONITORING AND ANALYSIS CENTER | SERVER IDENTIFIER |
| DC-A1 | EVENT/FAILURE INFORMATION | MA-B1 | 111111 |
| DC-A1 | SPECIFICS/CONFIGURATION INFORMATION | MA-A1 | 000111 |
| ... | ... | ... | ... |
| DC-B1 | EVENT/FAILURE INFORMATION | MA-B1 | 111111 |
| DC-B1 | SPECIFICS/CONFIGURATION INFORMATION | MA-B1 | 111222 |
| ... | ... | ... | ... |

INFORMATION RECIPIENT MANAGEMENT TABLE

*FIG. 12*

| TIME OF INFORMATION GENERATION | INFORMATION SOURCE | | INFORMATION RECIPIENT | | TRANSMITTED INFORMATION | | | | GLOBAL DATA FLAG |
|---|---|---|---|---|---|---|---|---|---|
| | DATA CENTER | APPARATUS IDENTIFIER | MONITORING AND ANALYSIS CENTER | SERVER IDENTIFIER | APPARATUS EVENT INFORMATION | APPARATUS FAILURE INFORMATION | APPARATUS SPECIFICS INFORMATION | APPARATUS CONFIGURATION INFORMATION | |
| 2018040100000000 | DC-A1 | 000001 | MA-A1 | 000000 | A01 | - | - | - | POSSIBLE |
| 2018040100000001 | DC-A1 | 000001 | MA-A1 | 000000 | - | A10 | - | - | POSSIBLE |
| 2018040100000002 | DC-B1 | 000000 | MA-B1 | 000000 | P01 | - | - | - | POSSIBLE |
| 2018040100000003 | DC-B1 | 000000 | MA-B1 | 000000 | - | P10 | - | - | POSSIBLE |
| 2018040100000004 | DC-A1 | 000111 | MA-B1 | 111111 | B01 | - | - | - | POSSIBLE |
| 2018040100000005 | DC-A1 | 000111 | MA-B1 | 111111 | - | B10 | - | - | POSSIBLE |
| 2018040100000006 | DC-A1 | 000111 | MA-B1 | 111111 | A03 | - | - | - | POSSIBLE |
| 2018040100000007 | DC-A1 | 000111 | MA-B1 | 111111 | - | A30 | - | - | POSSIBLE |
| 2018040100000008 | DC-A1 | 000001 | MA-A1 | 000111 | - | - | SENT | - | IMPOSSIBLE |
| 2018040100000009 | DC-A1 | 000001 | MA-A1 | 000111 | - | - | - | SENT | IMPOSSIBLE |

~180

TRANSMITTED INFORMATION MANAGEMENT TABLE

*FIG. 13*

| TIME OF INFORMATION GENERATION | INFORMATION SOURCE | | INFORMATION RECIPIENT | | TRANSMITTED INFORMATION | | | | GLOBAL DATA FLAG |
|---|---|---|---|---|---|---|---|---|---|
| | DATA CENTER | APPARATUS IDENTIFIER | MONITORING AND ANALYSIS CENTER | SERVER IDENTIFIER | APPARATUS EVENT INFORMATION | APPARATUS FAILURE INFORMATION | APPARATUS SPECIFICS INFORMATION | APPARATUS CONFIGURATION INFORMATION | |
| 2018040100000000 | DC-A1 | 000001 | MA-A1 | 000000 | A01 | - | - | - | POSSIBLE |
| 2018040100000001 | DC-A1 | 000001 | MA-A1 | 000000 | - | A10 | - | - | POSSIBLE |
| 2018040100000004 | DC-A1 | 000111 | MA-B1 | 111111 | B01 | - | - | - | POSSIBLE |
| 2018040100000005 | DC-A1 | 000111 | MA-B1 | 111111 | - | B10 | - | - | POSSIBLE |
| 2018040100000006 | DC-A1 | 000111 | MA-B1 | 111111 | A03 | - | - | - | POSSIBLE |
| 2018040100000007 | DC-A1 | 000111 | MA-B1 | 111111 | - | A30 | - | - | POSSIBLE |
| 2018040100000008 | DC-A1 | 000001 | MA-A1 | 000111 | - | - | FORWARDED | - | IMPOSSIBLE |
| 2018040100000009 | DC-A1 | 000001 | MA-A1 | 000111 | - | - | - | FORWARDED | IMPOSSIBLE |

DC-A1 TRANSMITTED INFORMATION MANAGEMENT TABLE

*FIG. 14*

| TIME OF INFORMATION GENERATION | INFORMATION SOURCE | | INFORMATION RECIPIENT | | TRANSMITTED INFORMATION | | | | GLOBAL DATA FLAG |
|---|---|---|---|---|---|---|---|---|---|
| | DATA CENTER | APPARATUS IDENTIFIER | MONITORING AND ANALYSIS CENTER | SERVER IDENTIFIER | APPARATUS EVENT INFORMATION | APPARATUS FAILURE INFORMATION | APPARATUS SPECIFICS INFORMATION | APPARATUS CONFIGURATION INFORMATION | |
| 2018040100000002 | DC-B1 | 000000 | MA-B1 | 000000 | P01 | - | - | - | POSSIBLE |
| 2018040100000003 | DC-B1 | 000000 | MA-B1 | 000000 | - | P10 | - | - | POSSIBLE |

DC-B1 TRANSMITTED INFORMATION MANAGEMENT TABLE

REGION R-A OPERATOR

DC-A1    INFORMATION FAILURE COMMUNICATE ...

| INCIDENTS | TIME OF INFORMATION GENERATION | INFORMATION RECIPIENT | | TRANSMITTED INFORMATION | | GLOBAL DATA FLAG |
|---|---|---|---|---|---|---|
| | | MONITORING AND ANALYSIS CENTER | SERVER IDEN-TIFIER | APPARATUS EVENT INFORMATION | APPARATUS FAILURE INFORMATION | |
| | 20180401000 00000 | MA-A1 | 000000 | A01 | - | POSSIBLE |
| | 20180401000 00001 | MA-A1 | 000000 | - | A10 | POSSIBLE |
| | 20180401000 00004 | MA-B1 | 111111 | B01 | - | POSSIBLE |
| | 20180401000 00005 | MA-B1 | 111111 | - | B10 | POSSIBLE |
| | 20180401000 00006 | MA-B1 | 111111 | A03 | - | POSSIBLE |
| | 20180401000 00007 | MA-B1 | 111111 | - | A30 | POSSIBLE |

REGION R-A OPERATOR

DC-A1    INFORMATION FAILURE COMMUNICATE ...

| INCIDENTS | ERROR | RELEVANT APPARATUS EVENT INFORMATION | RELEVANT APPARATUS FAILURE INFORMATION | PRESUMED CAUSE |
|---|---|---|---|---|
| | A | A01 | A10 | αA |
| | | A02 | A20 | βA |
| | B | B01 | B10 | αB |

REGION R-B OPERATOR

DC-A1    INFORMATION FAILURE COMMUNICATE ...

| INCIDENTS | TIME OF INFORMATION GENERATION | INFORMATION RECIPIENT | | TRANSMITTED INFORMATION | | GLOBAL DATA FLAG |
|---|---|---|---|---|---|---|
| | | MONITORING AND ANALYSIS CENTER | SERVER IDEN-TIFIER | APPARATUS EVENT INFORMATION | APPARATUS FAILURE INFORMATION | |
| | 20180401100 00000 | MA-A1 | 000000 | A04 | - | POSSIBLE |
| | 20180401100 00001 | MA-A1 | 000000 | - | A40 | POSSIBLE |
| | 20180401100 00004 | MA-B1 | 111111 | B01 | - | POSSIBLE |
| | 20180401100 00005 | MA-B1 | 111111 | - | B10 | POSSIBLE |
| | 20180401100 00006 | MA-B1 | 111111 | A03 | - | POSSIBLE |
| | 20180401100 00007 | MA-B1 | 111111 | - | A30 | POSSIBLE |

REGION R-B OPERATOR

DC-A1    INFORMATION FAILURE COMMUNICATE ...

| INCIDENTS | FAILURE EVENT | RELEVANT APPARATUS EVENT INFORMATION | RELEVANT APPARATUS FAILURE INFORMATION | PRESUMED CAUSE |
|---|---|---|---|---|
| | A | A01 | A10 | αA |
| | | A02 | A20 | βA |
| | B | B01 | B10 | αB |

| DC-A1 | INFORMATION FAILURE COMMUNICATE ... REGION R-B OPERATOR | | |
|---|---|---|---|
| INCIDENTS | IMPOSSIBLE | DATA ASSIGNED "IMPOSSIBLE" IS INCLUDED | "NOTIFY OPERATOR OF PERTINENT REGION" |
| | CONDITIONAL | - | |

| DC-A1 | ... FAILURE COMMUNICATE TICKET ... REGION R-B OPERATOR |
|---|---|
| INCIDENTS | INPUT REQUIRED INFORMATION TO TICKET AND NOTIFY OPERATOR OF PERTINENT REGION TO TURN OVER |

REGION R-A OPERATOR

DC-B1    INFORMATION FAILURE COMMUNICATE ...

| INCIDENTS | TIME OF INFORMATION GENERATION | INFORMATION RECIPIENT | | TRANSMITTED INFORMATION | | GLOBAL DATA FLAG |
|---|---|---|---|---|---|---|
| | | MONITORING AND ANALYSIS CENTER | SERVER IDEN-TIFIER | APPARATUS EVENT INFORMATION | APPARATUS FAILURE INFORMATION | |
| | 20180401000 00002 | MA-B1 | 000000 | P01 | - | POSSIBLE |
| | 20180401000 00003 | MA-B1 | 000000 | - | P10 | POSSIBLE |

REGION R-A OPERATOR

DC-B1    INFORMATION FAILURE COMMUNICATE ...

| INCIDENTS | FAILURE EVENT | RELEVANT APPARATUS EVENT INFORMATION | RELEVANT APPARATUS FAILURE INFORMATION | PRESUMED CAUSE |
|---|---|---|---|---|
| | A | A01 | A10 | αA |
| | | A02 | A20 | βA |
| | B | B01 | B10 | αB |

FIG. 31

COMPUTER SYSTEM

CLAIM OF PRIORITY

The present application claims priority from Japanese patent application JP2018-234063 filed on Dec. 14, 2018, the content of which is hereby incorporated by reference into this application.

BACKGROUND

This invention relates to a computer system.

Cloud service providers provides services utilizing data centers to their clients and performs maintenance operations on the data centers with a monitoring and analysis center. For the maintenance operations on the data centers, the operator extracts necessary information from information on the data centers collected by the monitoring and analysis center and checks it. If the monitoring and analysis center is highly loaded, the operator has to actually visit each data center to take information, store the information to the operator's own computer, and analyze it.

Distributing information from the data centers to multiple monitoring and analysis centers and processing the information there reduce the load per monitoring and analysis center, so that the information from the data centers can be appropriately processed at the monitoring and analysis centers. For example, an example of the distributed computing is disclosed in JP 2018-093281 A.

SUMMARY

The data centers and the monitoring and analysis centers are included in a network system. The network system has an information security policy specified therefor. The security policy reflects private rules and official lows and acts; they are security regulations in sending information to the external. For example, a network system in a specific area is prohibited from sending specific information to any network system in the other areas. Accordingly, the resources of a monitoring and analysis center included in one network system cannot be utilized effectively for the maintenance operations on a data center included in a different network system.

An aspect of this invention is a computer system configured to manage a plurality of systems to be monitored that belong to a plurality of networks and a plurality of monitoring/analysis servers that belong to the plurality of networks. The plurality of monitoring/analysis servers are configured to monitor or analyze the plurality of systems. The computer system includes one or more storage devices, and one or more processors that operate in accordance with a program stored in the one or more storage devices. The one or more storage devices store permission management information specifying relations between combinations of an information source and an information type and whether sending information from the information source to an external network system is permitted or prohibited. The one or more processor is configured to receive an information transmission request specifying an information type of first information from a first system of an information source, determine whether sending the first information to outside a network system the first system belongs to is permitted with reference to the permission management information, and select a monitoring/analysis server to receive the first information from the plurality of monitoring/analysis servers based on the determination.

An aspect of this invention achieves more effective utilization of the resources of a network system.

BRIEF DESCRIPTION OF THE DRAWINGS

FIG. 3 provides a configuration example of a default information recipient management table;

FIG. 4 provides a configuration example of a priority management table;

FIG. 6 provides a configuration example of an expected threshold exceedance pattern management table;

FIG. 7 provides a configuration example of a global data flag management table;

FIG. 8 provides a configuration example of a condition management table;

FIG. 9 provides a configuration example of a presumed failure cause management table;

FIG. 10 provides a configuration example of a guidance management table;

FIG. 11 provides a configuration example of a resource usage management table;

FIG. 12 provides a configuration example of an information recipient management table;

FIG. 13 provides a configuration example of a transmitted information management table;

FIG. 14 provides a configuration example of a DC-A1 transmitted information management table;

FIG. 15 provides a configuration example of a DC-B1 transmitted information management table;

FIG. 24 provides still another image displayed on a client;
FIG. 25 provides still another image displayed on a client;
FIG. 26 provides still another image displayed on a client;
FIG. 27 provides still another image displayed on a client;
FIG. 28 provides still another image displayed on a client;
FIG. 29 provides still another image displayed on a client;
FIG. 30 provides still another image displayed on a client;
FIG. 31 provides still another image displayed on a client.

DETAILED DESCRIPTION OF THE EMBODIMENTS

Hereinafter, embodiments of this invention will be described with reference to the accompanying drawings. It should be noted that the embodiments are merely examples to implement this invention and are not to limit the technical scope of this invention.

Figure 1:
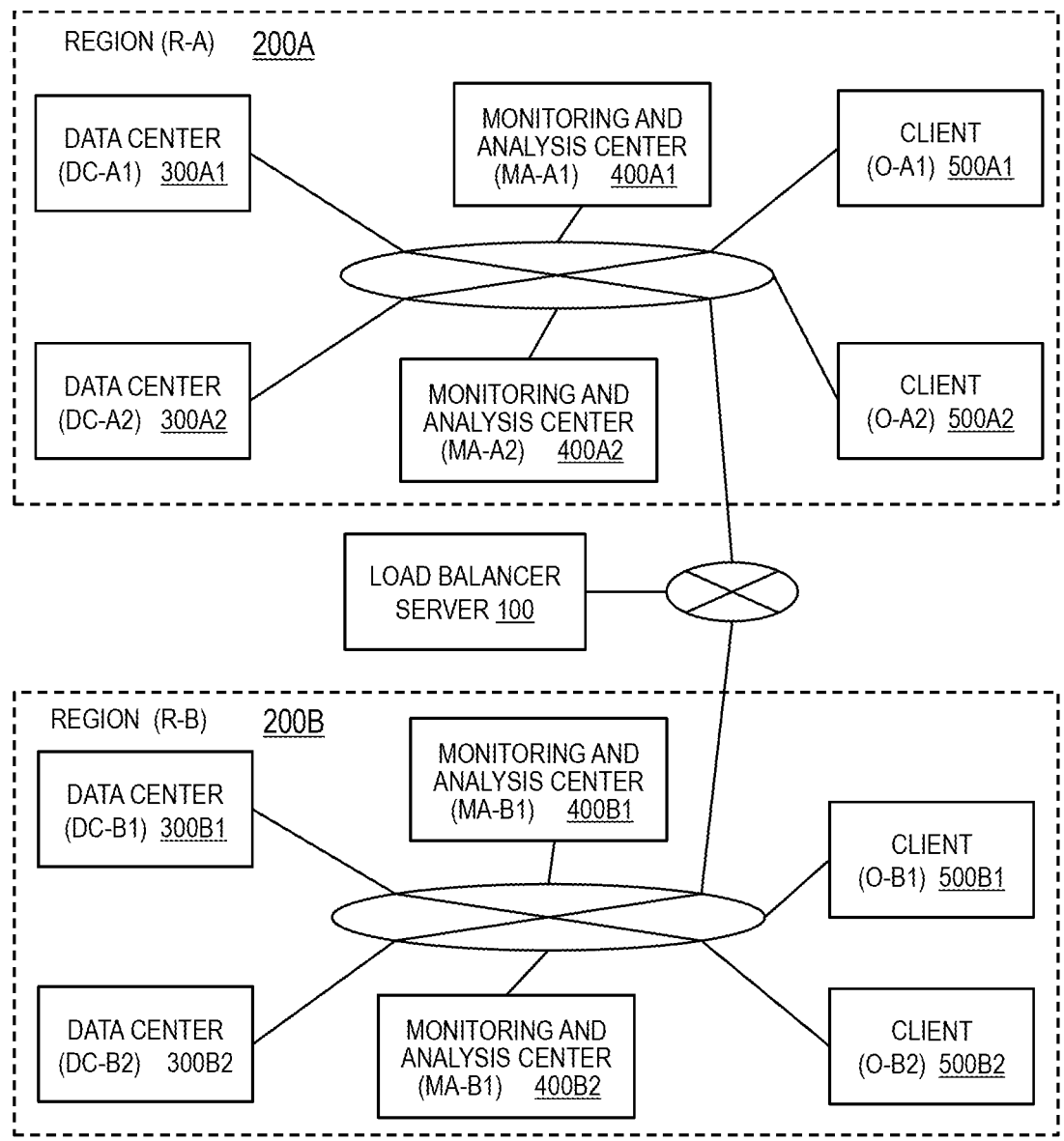
FIG. 1 illustrates a configuration example of a system in an embodiment.

FIG. 1 illustrates a configuration example of a system in an embodiment of this invention. This system includes different regions. In the following description, a region means a network system having a unique information security policy. A region can be a network system of a regional or a political organization like a nation, a state, or European Union or a network system of any type of an organization like a private or public organization. In this embodiment, the information security policy of a region regulates permission or prohibition and/or conditions for sending specific information from the region to another region.

FIG. 1 includes a region 200A and a region 200B by way of example; the system of this embodiment can include two or more regions. In FIG. 1, the character strings in the parenthesis within rectangles representing elements are the names of the elements. For example, the name of the region 200A is R-A and the name of the region 200B is R-B.

The region 200A includes one or more data centers, one or more monitoring and analysis centers, and one or more clients (computers). In the example of FIG. 1, the region 200A includes data centers 300A1 and 300A2, monitoring and analysis centers 400A1 and 400A2, and clients 500A1 and 500A2. The data centers 300A1 and 300A2 are the systems to be monitored and each include one or more apparatuses to be monitored (not shown). The apparatuses to be monitored can be storage apparatuses and servers, for example. The monitoring and analysis centers 400A1 and 400A2 each include one or more monitoring server and one or more analysis servers (not shown).

The region 200B includes one or more data centers, one or more monitoring and analysis centers, and one or more clients (computers). In the example of FIG. 1, the region 200B includes data centers 300B1 and 300B2, monitoring and analysis centers 400B1 and 400B2, and clients 500B1 and 500B2. The data centers 300B1 and 300B2 each include one or more apparatuses to be monitored (not shown). The apparatuses to be monitored can be storage apparatuses and servers, for example. The monitoring and analysis centers 400B1 and 400B2 each include one or more monitoring server and one or more analysis servers (not shown).

This system further includes a load balancer server 100. The load balancer server 100 can be included in either region; in the example of FIG. 1, it is included in a region other than the regions 200A and 200B. Each apparatus in the system in FIG. 1 can communicate with the other apparatuses via a network. The network topology of the system is not limited to a specific one; some of the apparatuses can be configured not to communicate with one another.

Each monitoring server collects and holds information on one or more apparatuses in one or more data centers and monitors their statuses. As will be described later, the monitoring server can receive information from the data centers 300A1, 300A2, 300B1 and 300B2 in both of the two regions 200A and 200B. Each analysis server analyzes information on one or more apparatuses in one or more data centers. As will be described later, the analysis server can receive information from the data centers 300A1, 300A2, 300B1 and 300B2 in both of the two regions 200A and 200B.

The clients 500A1, 500A2, 500B1, and 500B2 are each used by an operator to access the load balancer server 100 and the monitoring and analysis centers 400A1, 400A2, 400B1, and 400B2. The operator watches and analyzes the information held in the load balancer server 100 and/or the monitoring and analysis centers 400A1, 400A2, 400B1, and 400B2 to check the status of the data center 300A1, 300A2, 300B1, or 300B2.

Each client has a configuration of a common computer; it includes one or more processors and one or more storage devices and further, an input device and a display device (output device). The input device is a hardware device for the user to input an instruction or information for another apparatus. The display device is a hardware device to display various images for input or output.

The load balancer server 100 manages and controls transmission of information from the data centers 300A1, 300A2, 300B1, and 300B2 to the monitoring and analysis centers 400A1, 400A2, 400B1, and 400B2. Furthermore, the load balancer server 100 holds management information on the information sent from the data centers 300A1, 300A2, 300B1, and 300B2 to the monitoring and analysis centers 400A1, 400A2, 400B1, and 400B2 to support the operator using a client in information analysis.

Figure 2:
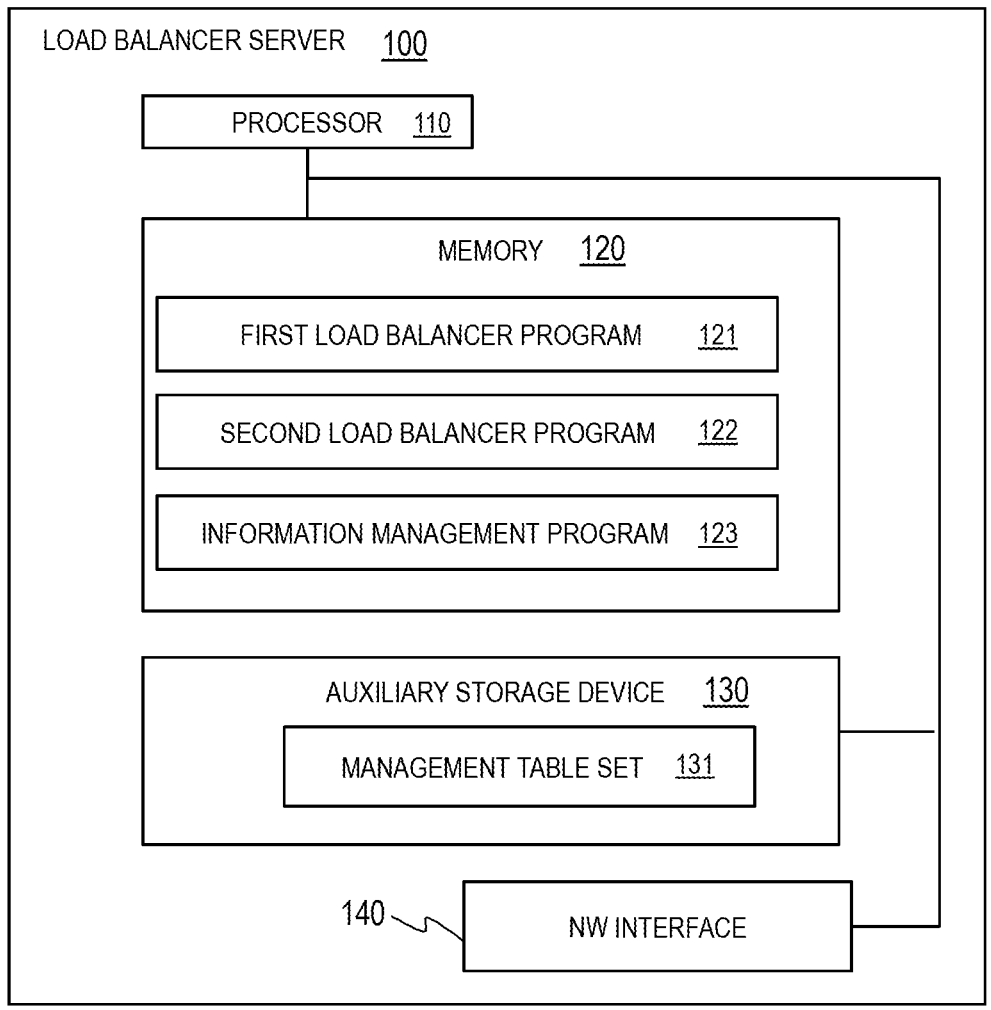
FIG. 2 illustrates a configuration example of a load balancer server.

FIG. 2 illustrates a configuration example of the load balancer server 100. The load balancer server 100 in the example of FIG. 2 is configured with one computer. The load balancer server 100 includes a processor 110, a memory 120, an auxiliary storage device 130, and a network (NW) interface 140. These elements are interconnected through a bus. The memory 120, the auxiliary storage device 130, or a combination of these are a storage device.

The memory 120 can be a semiconductor memory, and is mainly used to hold programs and data. The programs stored in the memory 120 include a first load balancer program 121, a second load balancer program 122, and an information management program 123, in addition to a not-shown operating system.

The processor 110 performs a variety of processing in accordance with the programs stored in the memory 120. The processor 110 operates in accordance with the programs to implement various function units. For example, the processor 110 operates in accordance with the aforementioned programs to work as a first load balancer, a second load balancer, and an information manager.

The auxiliary storage device 130 stores a management table set 131. The details of the tables (information) included in the management table set 131 will be described later. The auxiliary storage device 130 can be configured with large-capacity storage devices such as hard disk drives or solid-state drives and is used to hold programs and data on a long-term basis.

For convenience of explanation, the programs 121, 122, and 123 are stored in the memory 120 and the management table set 131 is stored in the auxiliary storage device 130; however, the storage locations of the data in the load balancer server 100 are not limited to the foregoing locations. For example, programs stored in the auxiliary storage device 130 are loaded to the memory 120 at the start-up or as needed and executed by the processor 110 to perform a variety of processing of the load balancer server 100. Accordingly, the processing performed by a program is processing performed by a function unit, the processor 110 or the load balancer server 100.

The network interface 140 is an interface for connecting the load balancer server 100 to the network. The load balancer server 100 makes communication with the other apparatuses in the system through the network interface 140.

The load balancer server 100 includes one or more processors and one or more storage devices. Each processor can include one or more computing units or processing cores. The processor can be implemented as a central processing unit, a microprocessor, a microcomputer, a microcontroller, a digital signal processor, a state machine, a logic circuit, a graphic processing unit, a chip-on system, and/or any device that operates a signal in accordance with a control instruction.

The functions of the load balancer server 100 can be implemented by distributed processing of a computer system including multiple servers. The multiple servers communicate with one another through a network to perform the processing cooperatively. For example, the first load balancer program 121, the second load balancer program 122, and the information management program 123 can be installed on different servers.

Hereinafter, examples of management tables included in the management table set 131 are described. The data including management information can have a desired structure, inclusive of table. The term for identifying an element is not limited to a specific one; expressions of "identification information", "identifier", "name", and "ID" are replaceable with one another.

FIG. 3 provides a configuration example of a default information recipient management table 161. The default information recipient management table 161 provides default settings of the relations between a data center that sends information and a server within a monitoring and analysis center to receive the information. The default information recipient management table 161 includes columns of information sources, information types, and information recipients.

An information source field indicates a data center to be monitored. Specifically, it includes the name of the data center and the name of the region the data center belongs to. An information type field indicates the type of the information to be sent from the data center to a monitoring and analysis center. In the following description, four types of information are used by way of example: apparatus event information, apparatus failure information, apparatus specifics information, and apparatus configuration information. The word "apparatus" is omitted in FIG. 3. The apparatus event information indicates an event occurring in an apparatus; the apparatus failure information indicates a failure occurring in an apparatus; the apparatus configuration information indicates the configuration of an apparatus; and the apparatus specifics information is more detailed information on the apparatus configuration than the apparatus configuration information.

An information recipient field indicates the server (apparatus) in a monitoring and analysis center to receive the information from the data center. Specifically, the information recipient field includes a server identifier, the name of the monitoring and analysis center the server belongs to, and the name of the region the monitoring and analysis center belongs to. As understood from the foregoing description, a combination of a data center of an information source and a type of the information to be sent is associated with a server in a monitoring and analysis center to receive the information.

FIG. 4 provides a configuration example of a priority management table 162. The priority management table 162 indicates priorities of the data centers in determining recipients of information about data centers. The priority management table 162 is prepared in advance in the load balancer server 100. The priority management table 162 has columns of information sources and priority levels. An information source field indicates the name of a data center and a priority level field indicates a priority level assigned to the data center. In this example, a smaller number represents a higher level.

Figure 5:
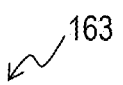
FIG. 5 provides a configuration example of a resource usage threshold management table.

FIG. 5 provides a configuration example of a resource usage threshold management table 163. The resource usage threshold management table 163 manages the thresholds for the usage of the computer resources (the loads) of individual servers (monitoring servers and analysis servers) in each monitoring and analysis center. The thresholds are referenced to determine whether to change the server to receive information on a data center. The resource usage threshold management table 163 is prepared in advance in the load balancer server 100.

The resource usage threshold management table 163 has columns of monitoring and analysis centers, server identifiers, and thresholds. A server identifier field indicates the identifier of a server in a monitoring and analysis center. A monitoring and analysis center field indicates the name of the monitoring and analysis center the server belongs to. A threshold field indicates thresholds assigned to the server. Specifically, each monitoring server is assigned thresholds for the capacity usage and the bandwidth usage. The capacity usage is the rate of the amount of stored data with respect to the capacity of the monitoring server to store information from data centers. The bandwidth usage is the rate of the communication bandwidth used by the monitoring server.

Each analysis server is assigned thresholds for the CPU usage and the bandwidth usage. As noted from these, appropriate kinds of thresholds are assigned depending on the processing of the monitoring server or the analysis server. Each monitoring server is assigned thresholds for the capacity usage and the bandwidth usage because the monitoring server collects and holds information from data centers. Each analysis server is assigned thresholds for the CPU usage and the bandwidth usage because the analysis server analyzes the information received from data centers.

FIG. 6 provides a configuration example of an expected threshold exceedance pattern management table 164. The expected threshold exceedance pattern management table 164 provides conditions (a pattern) expected to cause threshold exceedance of the usage of each computer resource of a monitoring server or an analysis server. The conditions are referenced to determine whether to change the server to receive information on a data center. The expected threshold exceedance pattern management table 164 is created by the load balancer server 100 using a known predictive correlation search function.

Each record (entry) of the expected threshold exceedance pattern management table 164 is about information to be sent to one monitoring/analysis server. It indicates that, if information is sent to a given monitoring/analysis server under the conditions provided in the record, the usage of a computer resource of the monitoring/analysis server will exceed its threshold.

The expected threshold exceedance pattern management table 164 has columns of information sources, information types, and patterns expected to cause threshold exceedance. An information source field indicates the name of the data center where the information is generated. An information type field indicates the type of the generated information (to be sent). As described above, the type of the information is apparatus event information, apparatus failure information, apparatus specifics information, or apparatus configuration information.

A pattern expected to cause threshold exceedance field has four sub-fields of an information size, a time of information generation, capacity usage (monitoring server), and CPU usage (analysis server). An information size field indicates the amount of data generated and sent within a predetermined unit time. A time of information generation field indicates when the information is generated. A capacity usage (monitoring server) field indicates the capacity usage of the monitoring server to receive the information immediately before the monitoring server receives the information. A CPU usage (analysis server) field indicates the CPU usage of the analysis server to receive the information immediately before the analysis server receives the information.

A combination of a data center of an information source and a type of the generated information is associated with a pattern expected to cause threshold exceedance. A pattern expected to cause threshold exceedance is composed of one or more of the aforementioned four conditional elements. In this example, each pattern includes a conditional element on resource usage.

For example, the first record indicates that the capacity usage of a monitoring server is expected to exceed its threshold under the conditions that apparatus event information or apparatus failure information is sent from the data center DC-A1 to the monitoring server, that the capacity usage of the monitoring server before receiving the information is T00% or more, and that the data amount of the information is S0 GB or more.

The second record indicates that the capacity usage of a monitoring server is expected to exceed its threshold under the conditions that apparatus event information or apparatus failure information is sent from the data center DC-A1 to the monitoring server, that the capacity usage of the monitoring server before receiving the information is T01% or more, and that the information is generated on "MONDAY, 00:00-01:00". The load balancer server 100 can have only either the resource usage threshold management table 163 or the expected threshold exceedance pattern management table 164.

FIG. 7 provides a configuration example of a global data flag management table 165. The global data flag management table 165 is an example of permission management information that specifies relations between combinations of an information source and an information type and whether sending the information from the information source to an external network system is permitted. The global data flag management table 165 shows global data flags assigned to individual types of information that are to be sent from each data center of an information source. The global data flag management table 165 is prepared in advance in the load balancer server 100.

The global data flag management table 165 has columns of information sources and global data flags. An information source field indicates the name of a data center of an information source. A global data flag field indicates global data flags for individual types of information that are to be sent from the data center.

The global data flag is information to control sending a particular type of information across the region. Specifically, the global data flag in this example indicates whether a particular type of information is permitted to be sent across the region and if permitted, whether any requirement has been specified. In the example described in the following, the categories of the permission are "POSSIBLE", "IMPOSSIBLE", and "CONDITIONAL". The categories of permission are determined appropriately to meet the security policy of the region.

In this example, "POSSIBLE" means that information is permitted to be sent to a different region unconditionally; "IMPOSSIBLE" means that information is prohibited to be sent to a different region; and "CONDITIONAL" means that information is permitted (conditionally permitted) to be sent to a different region if a specific condition is satisfied. Sending information within the same region is permitted in any case; a global data flag "POSSIBLE" is assigned.

The global data flags in this embodiment are common to the data centers that belong to the same region. Accordingly, an information source field can include the name of a region. In another example, the global data flags can be determined differently depending on the data center, instead of the region.

FIG. 8 provides a configuration example of a condition management table 166. The condition management table 166 provides conditions required to send information to another region when the global data flag is "CONDITIONAL". The condition management table 166 is prepared in advance in the load balancer server 100.

The condition management table 166 has columns of information sources and conditions when assigned global data flag is "CONDITIONAL" (hereinafter, simply referred to as conditions). An information source field indicates the name of a data center of an information source. A condition field indicates a condition to send information assigned "CONDITIONAL" from the data center to another region. In the example of FIG. 8, an example of the condition is encrypting the information using a specific algorithm.

FIG. 9 provides a configuration example of a presumed failure cause management table 167. The presumed failure cause management table 167 associates information from a data center with a presumed cause of a failure. The presumed failure cause management table 167 is referenced to support the operator. The presumed failure cause management table 167 is prepared in advance in the load balancer server 100.

The presumed failure cause management table 167 includes columns of failure event, relevant apparatus event information, relevant apparatus failure information, and presumed causes. A failure event field indicates the name of a failure event that occurs. A relevant apparatus event information field indicates the code of the apparatus event information relevant to the failure event. A relevant apparatus failure information field indicates the code of the apparatus failure information relevant to the failure event. A presumed cause field indicates a cause presumed from the combination of the name of the failure event, the apparatus event information, and the apparatus failure information. For example, when a failure event "A" occurs and if the relevant apparatus event information is "A01" and the relevant apparatus failure information is "A10", the presumed cause is "αA".

FIG. 10 provides a configuration example of a guidance management table 168. The guidance management table 168 manages guidance to be presented to the operator. The guidance management table 168 is prepared in advance in the load balancer server 100. The guidance management table 168 has columns of information sources, global data flag statuses, and guidance information.

An information source field indicates the name of a data center of an information source. A global data flag status field indicates that information assigned a specific global data flag is included. A guidance information field indicates a guidance message to be presented to the operator. If information from the data center identified by an information source is in the status indicated by a global data flag status field, the guidance message in the guidance information field is presented to the operator.

FIG. 11 provides a configuration example of a resource usage management table 171. The resource usage management table 171 manages current usage of computer resources of the monitoring/analysis (monitoring or analysis) servers in each monitoring and analysis center. The resource usage management table 171 is updated as needed by the load balancer server 100. The actual values in the resource usage management table 171 are compared with the thresholds in the resource usage threshold management table 163. The load balancer server 100 acquires actual values from the individual servers in each monitoring and analysis center.

The resource usage management table 171 has columns of monitoring and analysis centers, server identifiers, and actual values. A server identifier field indicates the identifier of a server in a monitoring and analysis center. A monitoring and analysis center field indicates the name of the monitoring and analysis center the server belongs to. An actual values field indicates actual values of the computer resource usage of the server. Specifically, the capacity usage and the bandwidth usage are acquired from a monitoring server. The capacity usage is the rate of the amount of stored data with respect to the capacity of the monitoring server for information from data centers. The bandwidth usage is the rate of the communication bandwidth used by the monitoring server. Furthermore, the CPU usage and the bandwidth usage are acquired from an analysis server.

FIG. 12 provides a configuration example of an information recipient management table 172. The information recipient management table 172 associates data centers with current potential recipients to receive information generated in the data centers. The load balancer server 100 creates an information recipient management table 172 by partially duplicating the default information recipient management table 161 and updates the created information recipient management table 172 as needed.

The information recipient management table 172 has columns of information sources, information types, and information recipients. In the columns of information sources and information recipients, the sub-columns of regions in the default information recipient management table 161 are omitted. The names of the data centers in the information source column and the values in the information type column are the same as those in the default information recipient management table 161. The information recipient column stores the values in the default information recipient management table 161 as initial values and is updated as needed. The details of updating the information recipient column will be described later.

FIG. 13 provides a configuration example of a transmitted information management table 180. The transmitted information management table 180 manages information (log information) sent from data centers to monitoring and analysis centers. The transmitted information management table 180 has columns of times of information generation, information sources, information recipients, transmitted information, and global data flags. A time of information generation field indicates the time when the information is generated. An information source field indicates the name of the data center and the identifier of the apparatus where the information is generated. An information recipient field indicates the name of the monitoring and analysis center and the identifier of the server to which the information is sent.

A transmitted information field indicates the details of the transmitted information. Specifically, in the case where the transmitted information is apparatus event information or apparatus failure information, the transmitted information field indicates the code of the transmitted information. The code represents information such as a type, about the event or failure. In the case where the transmitted information is apparatus specifics information or apparatus configuration information, the transmitted information field indicates the fact that the information is sent. A hyphen "-" means there is no input value. A global data flag field indicates the global data flag assigned to the transmitted information.

FIG. 14 provides a configuration example of a DC-A1 transmitted information management table 181. The DC-A1 transmitted information management table 181 is composed of information (records) including "DC-A1" as the information source that is extracted from the transmitted information management table 180. FIG. 15 provides a configuration example of a DC-B1 transmitted information management table 182. The DC-B1 transmitted information management table 182 includes information (records) including "DC-B1" as the information source that is extracted from the transmitted information management table 180. The load balancer server 100 creates and updates the transmitted information management tables about the other data centers. These transmitted information management tables about individual data centers are optional.

Figure 16:
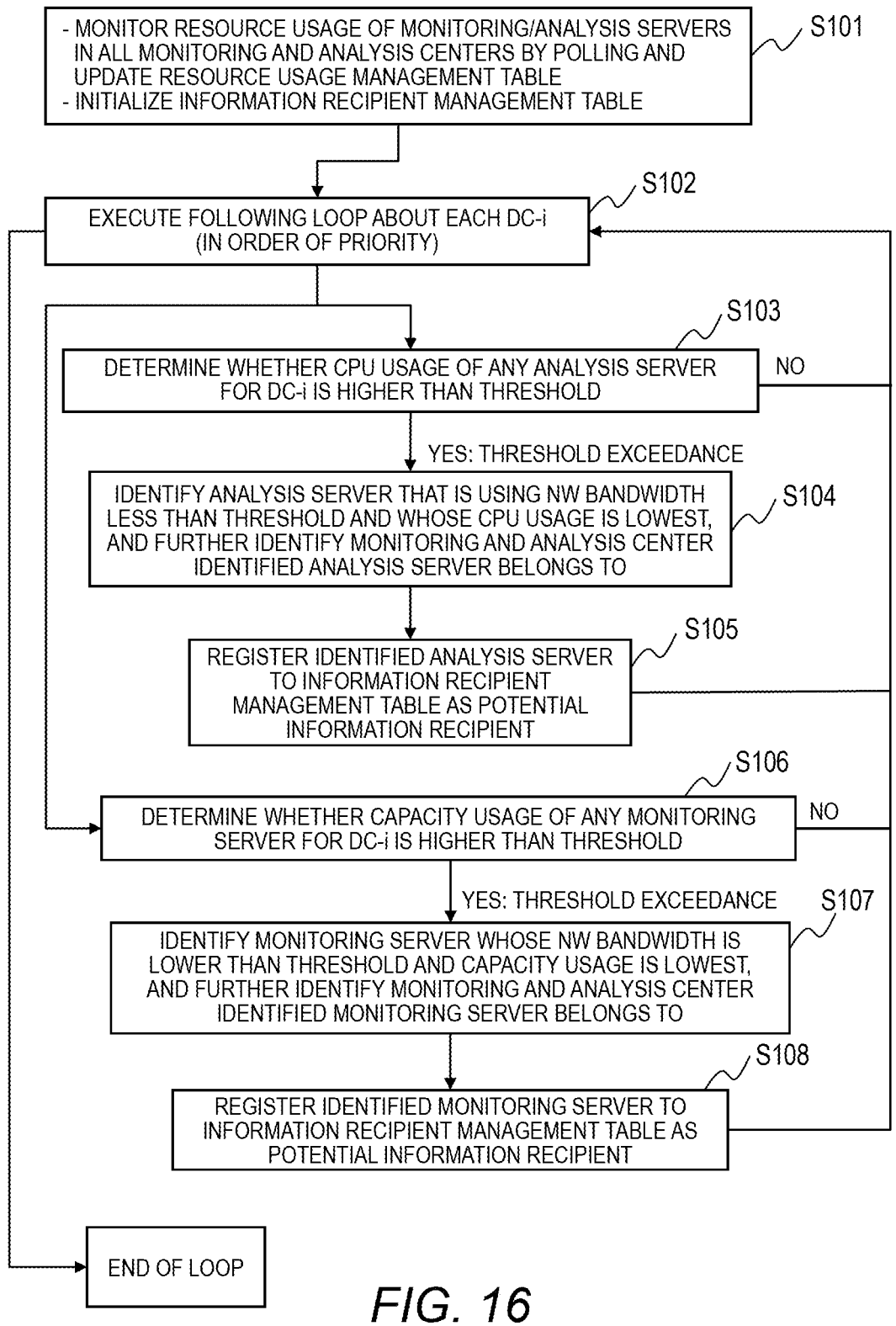
FIG. 16 is a flowchart for the load balancer server to update the information recipient management table.

Hereinafter, processing of the load balancer server 100 is described with reference to some flowcharts. FIG. 16 is a flowchart for the load balancer server 100 to update the information recipient management table 172. The load balancer server 100 determines monitoring/analysis servers to be potential recipients of information based on the loads or the usage of the computer resources of the monitoring/analysis servers in each monitoring and analysis center.

The first load balancer program 121 monitors the usage of the computer resources of the monitoring/analysis servers in all monitoring and analysis centers by polling (S101). The first load balancer program 121 updates the resource usage management table 171 with the information acquired from the monitoring/analysis servers and initializes the information recipient management table 172 with reference to the default information recipient management table 161.

Instead of polling, monitoring the monitoring and analysis centers can be performed by an event-driven method, for example by receiving a trap from an information source. In this case, the first load balancer program 121 executes the same processing only on the data center of the information source.

The first load balancer program 121 executes the loop from Step S103 to Step S108 for each data center DC-i (S102). The first load balancer program 121 executes this loop on the data centers one by one in the order of the priority from the highest to the lowest. As a result, a data center assigned a higher priority can be preferentially assigned an appropriate monitoring/analysis server.

The first load balancer program 121 determines whether the CPU usage of any analysis server for the data center DC-i is higher than its threshold with reference to the resource usage threshold management table 163, the resource usage management table 171, and the information recipient management table 172 (S103). If none of the CPU usage of the analysis servers is not higher than the threshold (S103: NO), the first load balancer program 121 maintains the default analysis servers for the DC-i.

If the CPU usage of some analysis server is higher than the threshold (S103: YES), the first load balancer program 121 identifies the analysis server that is using a NW bandwidth less than the threshold and whose CPU usage is the lowest and further identifies the monitoring and analysis center the identified analysis server belongs to with reference to the resource usage threshold management table 163 and the resource usage management table 171 (S104). The first load balancer program 121 registers the identified analysis server to the information recipient management table 172 as a potential information recipient (S105).

Further, the first load balancer program 121 determines whether the capacity usage of any monitoring server for the data center DC-i is higher than its threshold with reference to the resource usage threshold management table 163, the resource usage management table 171, and the information recipient management table 172 (S106). If none of the capacity usage of the monitoring servers is higher than the threshold (S106: NO), the first load balancer program 121 maintains the default monitoring servers for the DC-i.

If the capacity usage of some monitoring server is higher than the threshold (S106: YES), the first load balancer program 121 identifies the monitoring server that is using a NW bandwidth less than the threshold and whose capacity usage is the lowest and further identifies the monitoring and analysis center the monitoring server belongs to with reference to the resource usage threshold management table 163 and the resource usage management table 171 (S107). The first load balancer program 121 registers the identified monitoring server to the information recipient management table 172 as a potential information recipient (S108). In the loop, either the analysis servers or the monitoring servers can be determined first. Through this example, where to send the information can be determined appropriately, depending on the actual load on the monitoring/analysis server.

Figure 17:
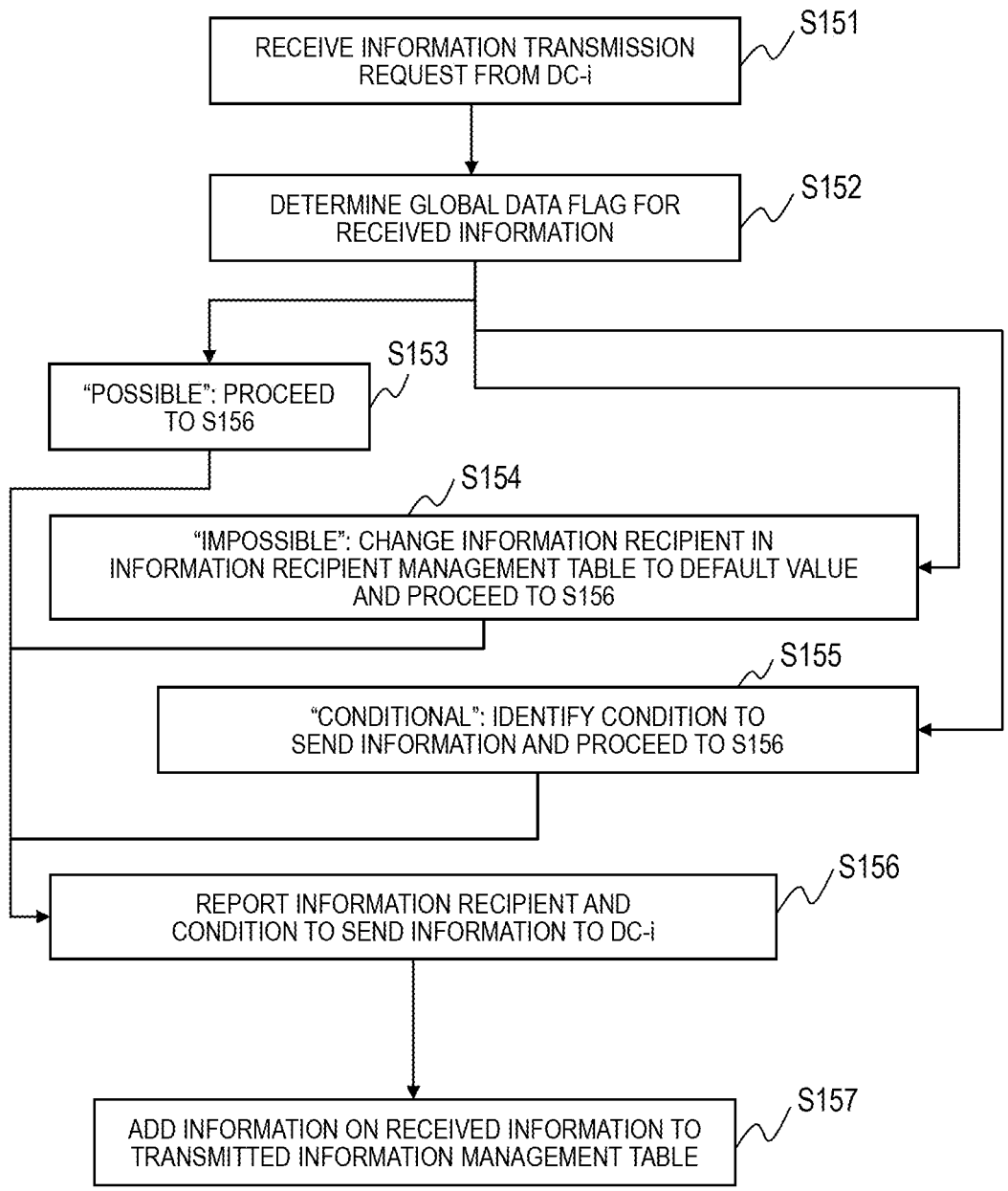
FIG. 17 is a flowchart for the load balancer server to determine where to send information from a given data center.

FIG. 17 is a flowchart for the load balancer server 100 to determine where to send information from a given data center. The first load balancer program 121 receives an information transmission request from some data center DC-i (S151). The information transmission request can be sent directly from the apparatus of the information source or transferred from a transfer server in the data center. The information transmission request includes information in a time of information generation field, an information source field, and a transmitted information field of the transmitted information management table 180.

The first load balancer program 121 determines a global data flag for the information on which the transmission request is received (S152). Specifically, the first load balancer program 121 determines a potential recipient of the information with reference to the information recipient management table 172. The first load balancer program 121 further determines whether the region including the potential recipient is the same as the region including the data center of the information source with reference to the default information recipient management table 161.

If the region including the potential recipient is the same as the region including the data center of the information source, the information can be sent without any condition; the global data flag is to be "POSSIBLE". If the region including the potential recipient is different from the region including the data center of the information source, the first load balancer program 121 determines the global data flag for the information with reference to the global data flag management table 165.

If the global data flag is determined to be "POSSIBLE", the first load balancer program 121 proceeds to Step S156 (S153). If the global data flag is determined to be "IMPOSSIBLE", the first load balancer program 121 changes the information recipient in the information recipient management table 172 to the default value specified in the default information recipient management table 161 and proceeds to S156 (S154). If the global data flag is determined to be "CONDITIONAL", the first load balancer program 121 identifies the condition to apply with reference to the condition management table 166 and proceeds to Step S156.

At Step S156, the first load balancer program 121 determines the recipient of the information on which the transmission request is received with reference to the information recipient management table 172 and reports it to the data center DC-i. If the global data flag assigned to the information is "CONDITIONAL", the first load balancer program 121 reports the condition to send the information together to the data center DC-i.

Next, the first load balancer program 121 adds information on the received information to the transmitted information management table 180 (S157). The information on the time of information generation, the information source, and the transmitted information is included in the transmission request received from the data center. The information recipient is determined at Step S156 and the global data flag is determined at Step S152.

As described above, the first load balancer program 121 determines the global data flag indicating whether sending the information to the outside of the network system is permitted and determines where to send the information based on the global data flag. The example described with reference to FIG. 17 changes the information recipient in the information recipient management table to the default value, if the type of the information is labelled as "IMPOSSIBLE". Unlike this example, the load balancer server 100 can prepare another potential recipient within the same region including the data center and determine to send the information to this potential recipient, if the type of the information is "IMPOSSIBLE".

In another example, the load balancer server 100 can update the information recipient management table 172 after receipt of an information transmission request. In that case, the load balancer server 100 can select a monitoring/analysis server from the same region including the data center of the information source, if the type of the information is "IMPOSSIBLE".

Figure 18:
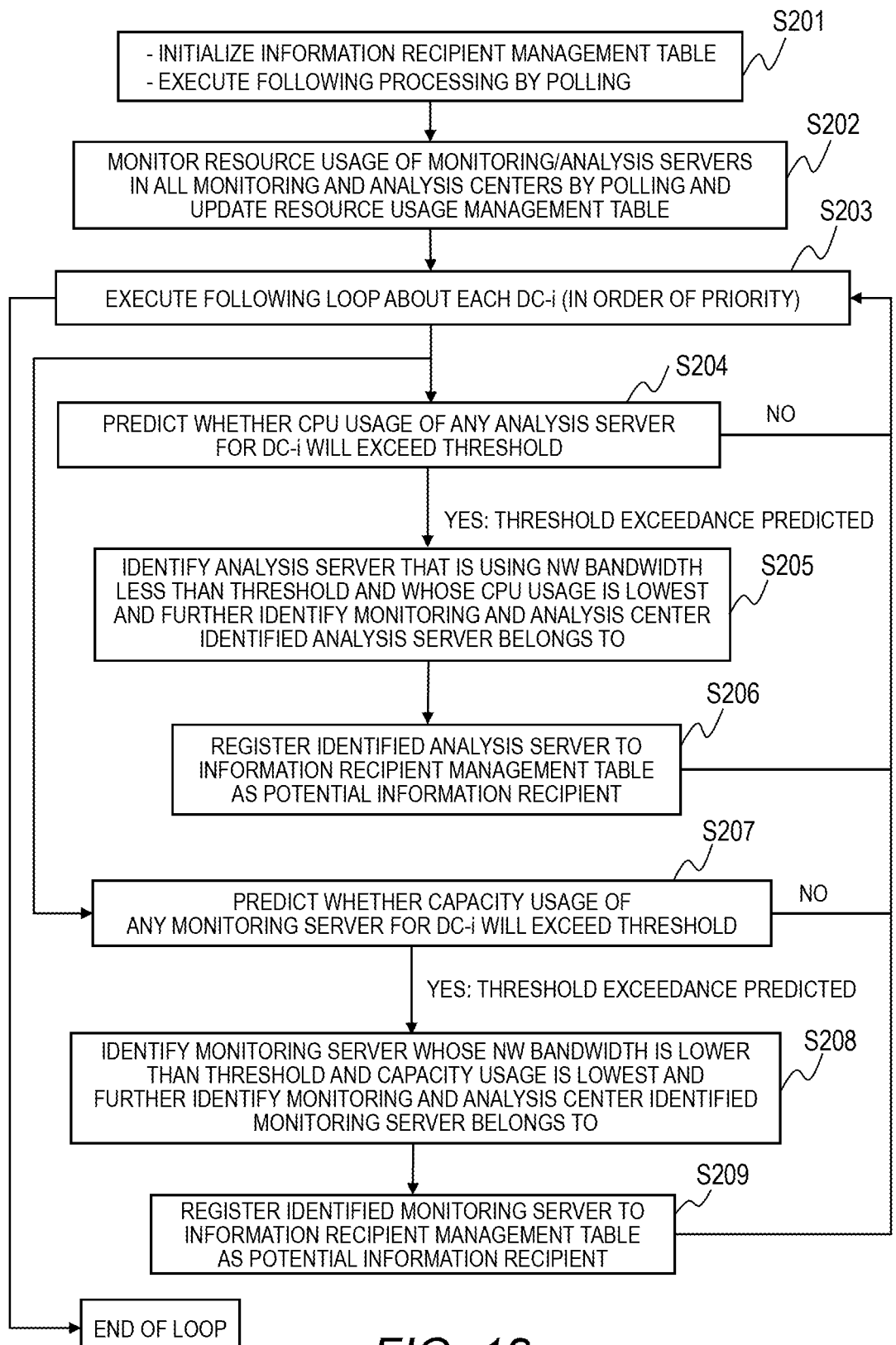
FIG. 18 is another flowchart for the load balancer server to update the information recipient management table.

FIG. 18 is another flowchart for the load balancer server 100 to update the information recipient management table 172. The load balancer server 100 determines the monitoring/analysis server to receive information based on the prediction on the overloads or the excessive resource usage of the monitoring/analysis servers in each monitoring and analysis center. If the status of a monitoring/analysis server matches a pattern in the expected threshold exceedance pattern management table 164, the load balancer server 100 predicts that the resource usage of the monitoring/analysis server will exceed the threshold.

The first load balancer program 121 initializes the information recipient management table 172 with reference to the default information recipient management table 162 (S201). The first load balancer program 121 performs the following processing by polling.

The first load balancer program 121 monitors the usage of the computer resources of the monitoring/analysis servers in all monitoring and analysis centers by polling (S202). The first load balancer program 121 updates the resource usage management table 171 with the information acquired from the monitoring/analysis servers. Monitoring the monitoring and analysis centers can be performed by an event-driven method, for example by receiving a trap from an information source, instead of by polling. In this case, the first load balancer program 121 executes the same processing only on the data center of the information source.

The first load balancer program 121 executes the loop from Step S204 to S209 for each data center DC-i (S203). The first load balancer program 121 executes this loop on the data centers one by one in the order of the priority from the highest to the lowest. As a result, a data center assigned a higher priority can be preferentially assigned an appropriate monitoring/analysis server.

The first load balancer program 121 predicts whether the CPU usage of any analysis server for the data center DC-i will exceed its threshold with reference to the resource usage threshold management table 163, the resource usage management table 171, and the information recipient management table 172 (S204). If the prediction is that none of the CPU usage of the analysis servers will exceed the threshold (S204: NO), the first load balancer program 121 maintains the default analysis servers for the data center DC-i.

If the prediction is that the CPU usage of some analysis server will exceed the threshold (S204: YES), the first load balancer program 121 identifies the analysis server that is using a NW bandwidth less than the threshold and whose CPU usage is the lowest and further identifies the monitoring and analysis center the identified analysis server belongs to with reference to the resource usage threshold management table 163 and the resource usage management table 171 (S205). The first load balancer program 121 registers the identified analysis server to the information recipient management table 172 as a potential information recipient (S206).

Further, the first load balancer program 121 predicts whether the capacity usage of any monitoring server for the data center DC-i will exceed its threshold with reference to the resource usage threshold management table 163, the resource usage management table 171, and the information recipient management table 172 (S207). If the prediction is none of the capacity usage of the monitoring servers will exceed the threshold (S207: NO), the first load balancer program 121 maintains the default monitoring servers for the data center DC-i.

If the prediction is that the capacity usage of some monitoring server will exceed the threshold (S207: YES), the first load balancer program 121 identifies the monitoring server that is using a NW bandwidth less than the threshold and whose capacity usage is the smallest and further identifies the monitoring and analysis center the monitoring server belongs to with reference to the resource usage threshold management table 163 and the resource usage management table 171 (S208). The first load balancer program 121 registers the identified monitoring server to the information recipient management table 172 as a potential information recipient (S209).

Through this example, whether the resource usage of each monitoring/analysis server will exceed its threshold is predicted and an appropriate information recipient is determined. In the loop, either the analysis servers or the monitoring servers can be determined first. The processing in response to receipt of an information transmission request is the same as described with reference to FIG. 17. The load balancer server 100 can execute only either the processing in FIG. 16 or the processing in FIG. 18 or execute both at appropriate times.

As described above, this embodiment selects a potential recipient for information from a data center from a plurality of regions based on the loads (resource usage) of the monitoring/analysis servers. This configuration achieves effective utilization of the resources of the monitoring and analysis centers in a plurality of regions. Further, the embodiment manages the security policy (specifying security regulations reflecting private rules and official lows and acts) specified for each region to determine where to and how to send the information in accordance with the security policy; accordingly, transmission of information across regions is controlled appropriately.

Figure 19:
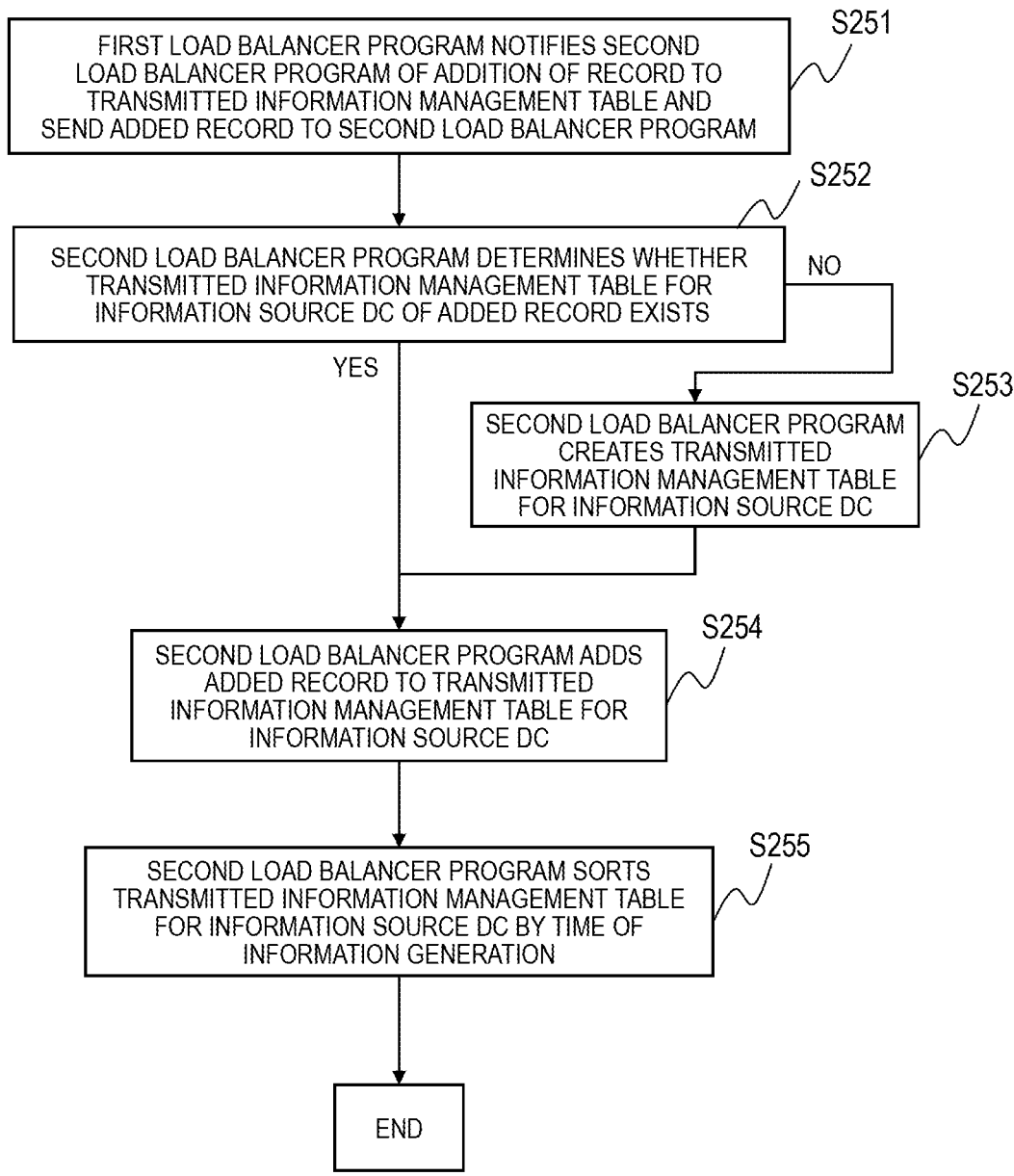
FIG. 19 is a flowchart for the load balancer server to create and update a transmitted information management table for a specific DC.

FIG. 19 is a flowchart for the load balancer server 100 to create and update a transmitted information management table for a specific DC. This processing is push-type processing. The first load balancer program 121 notifies the second load balancer program 122 of addition of a record to the transmitted information management table 180 and further, sends the added record to the second load balancer program 122 (S251). The second load balancer program 122 determines whether the transmitted information management table for the DC of the information source indicated in the added record exists (S252).

If the transmitted information management table for the DC does not exist (S252: NO), the second load balancer program 122 creates a transmitted information management table for the DC (S253). If the transmitted information management table for the DC exists (S252: YES or S253), the second load balancer program 122 adds the added record to the transmitted information management table for the DC (S254). The second load balancer program 122 sorts the records in the transmitted information management table for the DC by the time of information generation (S255). The sorting can be performed by the information management program 123 to be described later.

Figure 20:
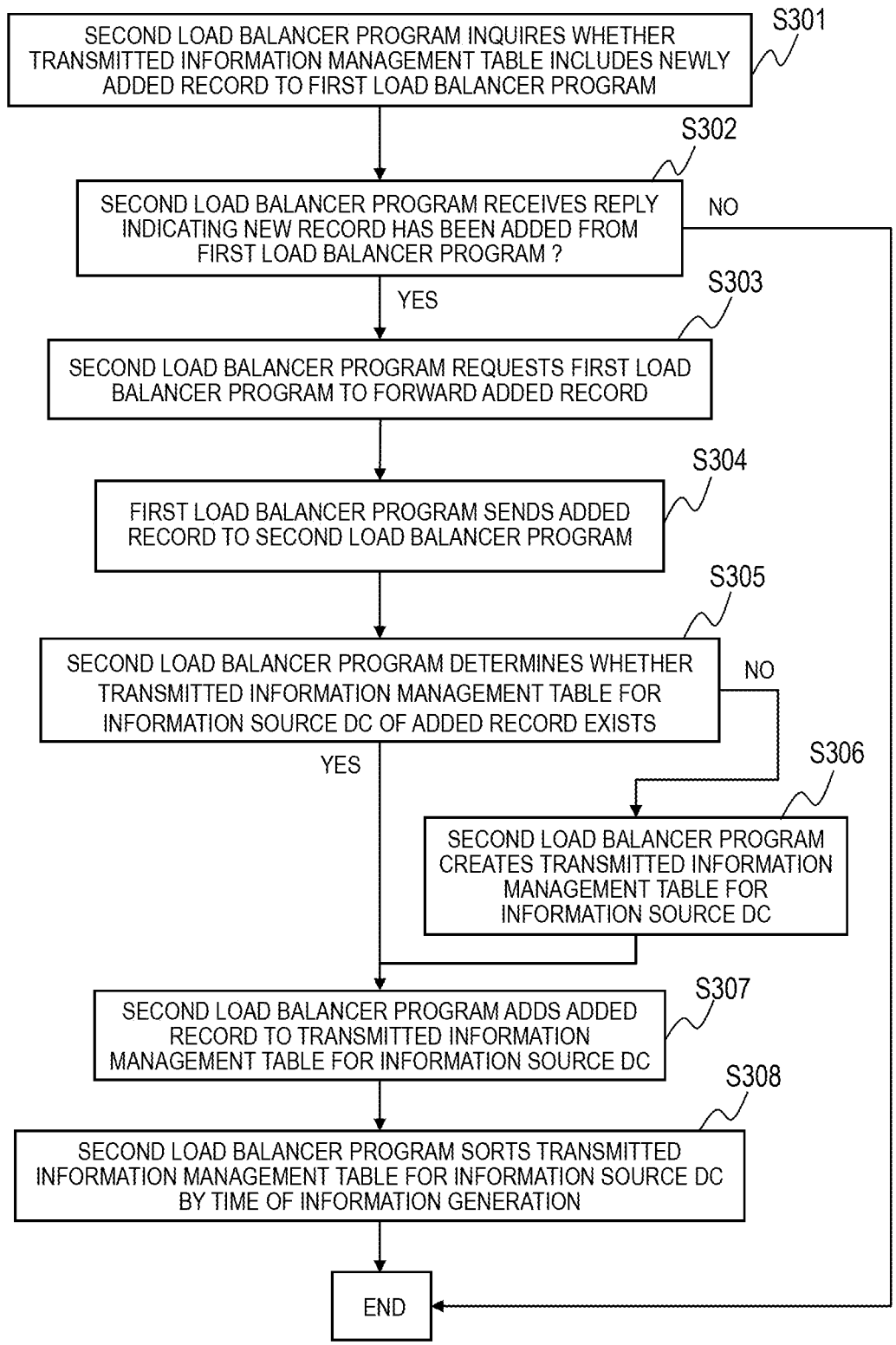
FIG. 20 is another flowchart for the load balancer server to create and update a transmitted information management table for a specific DC.

FIG. 20 is another flowchart for the load balancer server 100 to create and update a transmitted information management table for a specific DC. This processing is pull-type processing. The second load balancer program 122 inquires whether the transmitted information management table 180 includes a newly added record to the first load balancer program 121 (S301). The second load balancer program 122 receives a reply indicating that a new record has been added from the first load balancer program 121 (S302).

The second load balancer program 122 requests the first load balancer program 121 to forward the added record (S303). The first load balancer program 121 sends the added record to the second load balancer program 122 (S304). The second load balancer program 122 determines whether the transmitted information management table for the DC of the information source indicated in the added record exists (S305).

If the transmitted information management table for the DC does not exist (S305: NO), the second load balancer program 122 creates a transmitted information management table for the DC (S306). If the transmitted information management table for the DC exists (S305: YES or S306), the second load balancer program 122 adds the added record to the transmitted information management table for the DC (S307). The second load balancer program 122 sorts the records in the transmitted information management table for the DC by the time of information generation (S308). The sorting can be performed by the information management program 123 to be described later.

Hereinafter, a graphical user interface (GUI) for the load balancer server 100 to support the operator is described. First, an example of supporting an operator in the same region the data center belongs to is described. Assume that the region is a region R-A and the operator requests information about a data center DC-A1.

Figure 21:
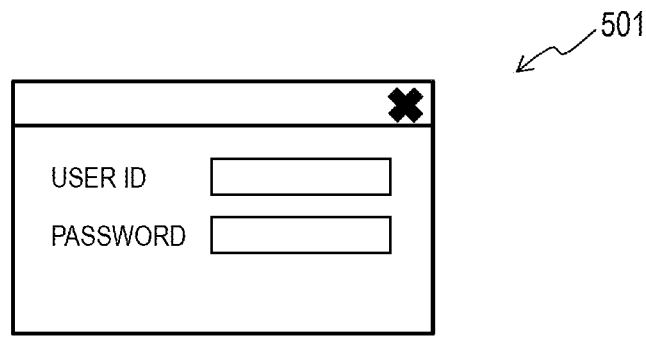
FIG. 21 provides an image displayed on a client.

First, the information management program 123 sends data for the image 501 shown in FIG. 21 to the client (client 500A1) being used by the operator and makes the client to display the image on its display device. The operator enters the user ID and the password for the operator site of the region R-A. The information management program 123 receives the entered user ID and password.

Figure 22:
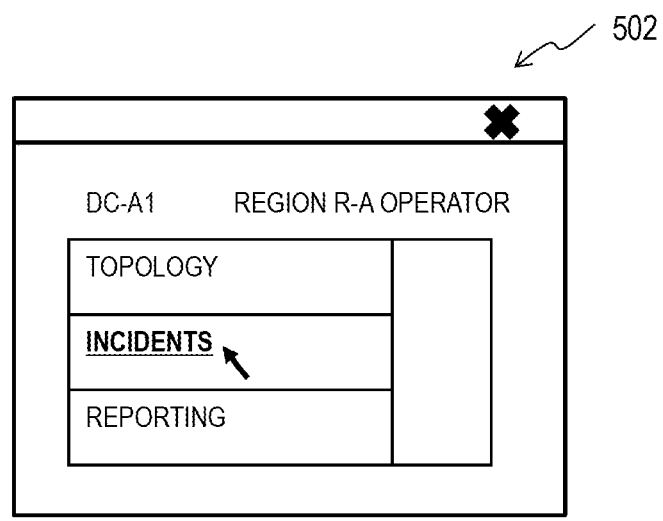
FIG. 22 provides another image displayed on a client.

In response to designation of the data center DC-A1 from the client 500A1, the information management program 123 makes the client 500A1 display the image 502 shown in FIG. 22. Assume that the operator selects "INCIDENTS" there. The information management program 123 receives an instruction to show "INCIDENTS" from the client 500A1. The instruction to show "INCIDENTS" includes an instruction to show "INFORMATION" on the incidents.

Figure 23:
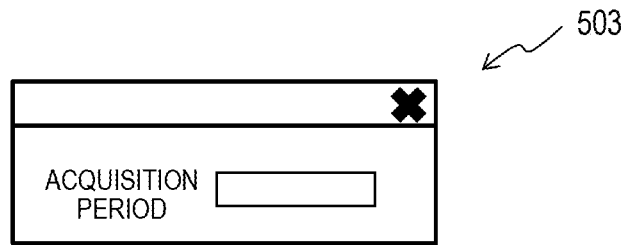
FIG. 23 provides still another image displayed on a client.

The information management program 123 makes the client 500A1 to display the image 503 shown in FIG. 23. The operator enters a desired acquisition period of the information and sends it to the load balancer server 100. The information management program 123 selects records in the designated period from the DC-A1 transmitted information management table 181 and creates a copy transmitted information management table including the records in the designated period. The records to be selected are records in which values in the time of information generation fields are included in the designated period. The information management program 123 makes the client 500A1 display the image 504 shown in FIG. 24, using the copied records.

The operator can see the information generated in the data center DC-A1 in the designated period through FIG. 24. Since the DC-A1 transmitted information management table 181 has been prepared in advance, the request from the operator is speedily responded to.

Next, the case where the operator selects "FAILURE" in the image 504 in FIG. 24 is described. The information management program 123 receives an instruction to show "FAILURE" from the client 500A1. The information management program 123 accesses the above-described copy transmitted information management table including the records in the designated period selected from the DC-A1 transmitted information management table 181 and the presumed failure cause management table 167.

The information management program 123 creates an image showing whether the copy transmitted information management table includes any pair of a code of apparatus event information and a code of apparatus failure information in the presumed failure cause management table 167 and makes the client 500A1 display the image. In this example, the information management program 123 copies the presumed failure cause management table 167 to create the image 505 shown in FIG. 25. The image 505 shows the determination results on the presumed causes.

If a pair of a code of apparatus event information and a code of apparatus failure information in the presumed failure cause management table 167 is included in the copy transmitted information management table, the corresponding record is displayed with a white background in the image 505. The record consists of cells of failure event, apparatus event information, apparatus failure information, and a presumed cause.

If a pair of a code of apparatus event information and a code of apparatus failure information in the presumed failure cause management table 167 is not included in the copy transmitted information management table, the corresponding record is grayed out in the image 505. In this example, if either a code of apparatus event information or a code of apparatus failure information does not match, the cells of the apparatus event information, the apparatus failure information, and the presumed failure cause are grayed out. The way to display the match/mismatch with a pair of a code of apparatus event information and a code of apparatus failure information in the presumed failure cause management table 167 can be designed desirably.

As described above, the operator can know the presumed cause of a failure occurring in the data center DC-A1 with reference to the image of FIG. 25. Hence, the variations in service quality among operators can be reduced.

Next, an example where an operator in a region different from the region of a data center sees information on the data center is described. Enabling an operator in a region different from the region of a data center to address a failure in the data center allows flexible management of the maintenance of the data center with operators of different regions. The following example is described assuming that an operator of the region R-B requests information on the data center DC-A1 with a client 500B1. As described with reference to FIGS. 21, 22, and 23, the operator sends necessary information to the load balancer server 100.

FIG. 26 provides an image 513 to be displayed by the client 500B1 when the information management program 123 receives an instruction to show "INFORMATION" on the data center DC-A1 from an operator of the region R-B. The image 513 corresponds to the image shown in FIG. 24. The information management program 123 creates the image 513 and makes the client 500B1 display the image as described with reference to FIG. 24.

FIG. 27 provides an image 514 to be displayed by the client 500B1 when the operator selects "FAILURE" in the image 513 of FIG. 26. The image 514 shows the determination results on the presumed causes. In this example, the copy transmitted information management table does not include any pair of a code of apparatus event information and a code of apparatus failure information in the presumed failure cause management table 167. This means the cause is unknown. Accordingly, all records are grayed out in the image 514.

FIG. 28 provides an image 515 to be displayed by the client 500B1 when the operator selects "COMMUNICATE" in the image 514 of FIG. 27. The information management program 123 receives an instruction to "COMMUNICATE" from the client 500B1 and makes the client 500B1 display the image 515.

The information management program 123 searches the aforementioned copy transmitted information management table including records in the designated period selected from the DC-A1 transmitted information management table 181 for data assigned "IMPOSSIBLE" or "CONDITIONAL". If data assigned "IMPOSSIBLE" is included, the information management program 123 accesses the guidance management table 168 to acquire guidance information for the case where the information source is the data center DC-A1 and the global data flag status is "Data assigned IMPOSSIBLE is included", and includes the acquired guidance information in the image 515.

If data assigned "CONDITIONAL" is included, the information management program 123 accesses the guidance management table 168 to acquire guidance information for the case where the information source is the data center DC-A1 and the global data flag status is "Data assigned CONDITIONAL is included", and includes the acquired guidance information in the image 515.

Showing the operator an action to take in the form of guidance information increases the efficiency of the operator's work and further, reduces the variations in service quality among operators. Even if transmission of specific information from a region to another is prohibited, a failure in a data center can be addressed appropriately.

FIG. 29 provides an image 516 to be displayed by the client 500B1 when the operator selects "NOTIFY OPERATOR OF PERTINENT REGION" in the image 515 of FIG. 28. The information management program 123 receives an instruction to "NOTIFY OPERATOR OF PERTINENT REGION" from the client 500B1 and makes the client 500B1 to display the image 516. The information management program 123 urges the operator to create an "INCIDENT TICKET (NEW)" through the image 516. Hence, the communication between operators can be made more efficient.

According to the example described above, an operator of a region different from the region of a data center acquires appropriate information to address a failure event occurring in the data center. Hence, efficient work of the operator, effective utilization of human resources of a plurality of regions, and appropriate reaction to a failure occurring in a data center become available.

Next, an example where an operator of the region R-A sees information on the data center DC-B 1 in the region R-B is described. Assume that an operator of the region R-A requests information on the data center DC-B1 with the client 500A1. The operator sends necessary information to the load balancer server 100 as described with reference to FIGS. 21, 22, and 23.

FIG. 30 provides an image 521 to be displayed by the client 500A1 when the information management program 123 receives an instruction to show "INFORMATION" on the data center DC-B1 from an operator of the region R-A. The image 521 corresponds to the image shown in FIG. 24 or 26. The information management program 123 creates the image 521 and makes the client 500A1 display the image as described with reference to FIG. 24.

FIG. 31 provides an image 522 to be displayed by the client 500A1 when the operator selects "FAILURE" in the image 521 of FIG. 30. The image 522 shows the determination results on the presumed causes. In this example, the copy transmitted information management table does not include any pair of a code of apparatus event information and a code of apparatus failure information in the presumed failure cause management table 167. This means the cause is unknown. Accordingly, all records are grayed out in the image 522.

Figure 32:
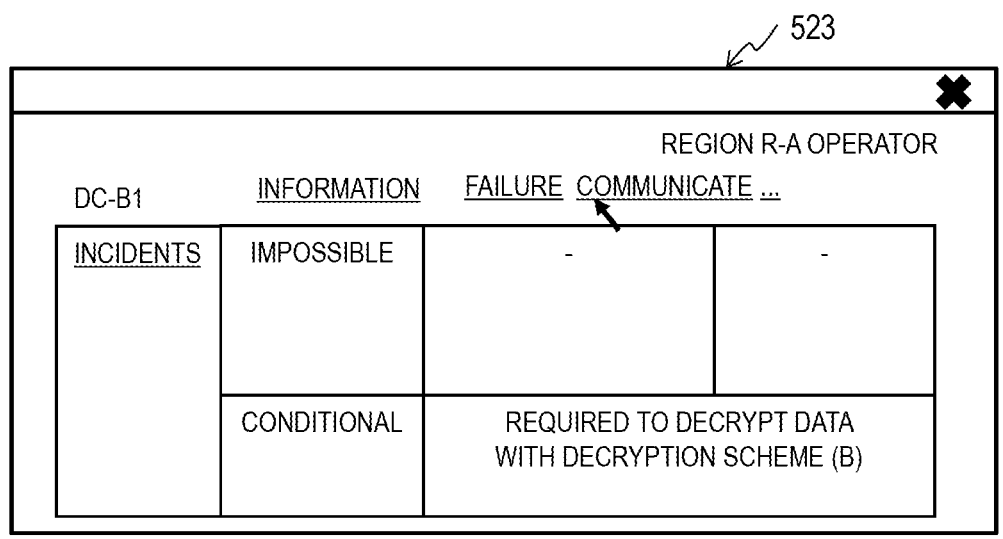
FIG. 32 provides still another image displayed on a client.

FIG. 32 provides an image 523 to be displayed by the client 500A1 when the operator selects "COMMUNICATE" in the image 522 of FIG. 31. The information management program 123 receives an instruction to "COMMUNICATE" from the client 500A1 and makes the client 500A1 display the image 523.

The information management program 123 searches the aforementioned copy transmitted information management table including records in the designated period selected from the DC-B1 transmitted information management table 182 for data assigned "IMPOSSIBLE" or "CONDITIONAL". If data assigned "IMPOSSIBLE" is included, the information management program 123 accesses the guidance management table 168 to acquire guidance information for the case where the information source is the data center DC-B1 and the global data flag status is "Data assigned IMPOSSIBLE is included" and includes the acquired guidance information in the image 523.

If data assigned "CONDITIONAL" is included, the information management program 123 accesses the guidance management table 168 to acquire guidance information for the case where the information source is the data center DC-B1 and the global data flag status is "Data assigned CONDITIONAL is included" and includes the acquired guidance information in the image 523.

The operator of the region R-A downloads encrypted data to the client 500A1 in accordance with the guidance shown in the image 523 and decrypts the encrypted data with the decryption scheme (B).

Showing the operator an action to take in the form of guidance information increases the efficiency of the operator's work and further, reduces the variations in service quality caused by differences in skills among the operators. Even if transmission of specific information from a region to another is permitted only in a specific way, a failure in a data center can be addressed appropriately.

As described above, embodiments of this invention improve the return on assets (ROA)/total cost of ownership (TCO) of a system including data centers and monitoring and analysis centers. Specifically, allowing information generated in a data center to be sent to not only a monitoring and analysis center in the same region the data center belongs to but also a monitoring and analysis center in a different region leads to effective utilization of the resources within the system. As a result, timely monitoring and analysis of the data centers become available.

Managing security policies to send information across regions and controlling sending information in accordance with the policies allow information generated in a data center to be sent to a monitoring and analysis center appropriately. For example, in developing and operating IT services on a global basis, the IT resources in different sites can be utilized effectively.

Presenting information on information sent from a data center to a monitoring and analysis center and providing guidance on the action to take to an operator improve the work efficiency of the operator. Furthermore, operators of different regions become able to seamlessly and cooperatively check for and analyze a failure; the maintenance operation on one data center can be performed flexibly by operators of multiple regions.

Furthermore, the improvement in work efficiency of the operators allows lowering the fee for the operators' maintenance operation services on a data center. Alternatively, higher-level and more speedily maintenance operation services can be provided to the clients for the same fee.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated to a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A computer system configured to manage a plurality of systems to be monitored that belong to a plurality of networks and a plurality of monitoring/analysis servers that belong to the plurality of networks,
the plurality of monitoring/analysis servers being configured to monitor or analyze the plurality of systems, and
the computer system comprising:
one or more storage devices; and
one or more processors that operate in accordance with a program stored in the one or more storage devices,
wherein the one or more storage devices store permission management information specifying relations between combinations of an information source and an information type and whether sending information from the information source to an external network system is permitted or prohibited, and
wherein the one or more processors are configured to:
receive an information transmission request specifying an information type of first information from a first system of an information source;
determine whether sending the first information to outside a network system the first system belongs to is permitted with reference to the permission management information; and
select a monitoring/analysis server to receive the first information from the plurality of monitoring/analysis servers based on the determination; and
wherein the one or more storage devices store:
information recipient management information associating each of the plurality of systems to be monitored with a monitoring/analysis server of a potential recipient of information on the system; and
resource usage threshold management information managing thresholds for usage of computer resources of the plurality of monitoring/analysis servers, and
wherein the one or more processors are configured to:
select a monitoring/analysis server as a primary potential recipient of information generated in the first system with reference to the information recipient management information; and
select another monitoring/analysis server as another potential recipient from a plurality of remaining monitoring/analysis servers based on usage of computer resources of the plurality of remaining monitoring/analysis servers in a case where usage of a computer resource of the monitoring/analysis server of the primary potential recipient is higher than a threshold specified in the resource usage threshold management information.

2. The computer system according to claim 1, wherein the one or more processors are configured to select a monitoring/analysis server as a potential recipient of the first information from the plurality of monitoring/analysis servers based on usage of computer resources of the plurality of monitoring/analysis servers.

3. The computer system according to claim 1, wherein the one or more processors are configured to select the monitoring/analysis servers as potential recipients of information generated in the plurality of systems in order of priorities assigned to the plurality of systems.

4. The computer system according to claim 1,
wherein the one or more storage devices store history of information sent from the plurality of systems to the plurality of monitoring/analysis servers, and
wherein the one or more processors are configured to select a record from the history in accordance with a request from a client and send the selected record to the client.

5. The computer system according to claim 4,
wherein the one or more storage devices store separate history tables about individual systems to be monitored, each history table including history of information sent from a system to the plurality of monitoring/analysis servers, and
wherein the one or more processors are configured to select a record from the history table about a system designated in the request from the client and send the selected record to the client.

6. The computer system according to claim 1,
wherein the one or more storage devices store:
history of information sent from the plurality of systems to be monitored to the plurality of monitoring/analysis servers; and
presumed failure cause management information associating information generated in the plurality of systems with presumed causes of failures, and
wherein the one or more processors are configured to:
receive designation of a system from a client;
create an image showing a determination result on a failure occurring in the system based on history of information generated in the system and the presumed failure cause management information; and
send the created image to the client.

7. The computer system according to claim 1,
wherein the one or more storage devices store guidance management information specifying guidance messages for individual combinations of a system to be monitored and a category of permission defined in the permission management information, and
wherein the one or more processors are configured to:
receive designation of a second system from a client;
select a guidance message from the guidance management information based on a category of permission assigned to information generated in the second system, a network system the client belongs to, and a network system the second system belongs to; and
send the selected guidance message to the client.

8. The computer system according to claim 1, wherein categories of permission included in the permission management information include unconditional permission, conditional permission, and prohibition.

9. A computer system,
configured to manage a plurality of systems to be monitored that belong to a plurality of networks and a plurality of monitoring/analysis servers that belong to the plurality of networks,
the plurality of monitoring/analysis servers being configured to monitor or analyze the plurality of systems, and
the computer system comprising:
one or more storage devices; and
one or more processors that operate in accordance with a program stored in the one or more storage devices,
wherein the one or more storage devices store permission management information specifying relations between combinations of an information source and an information type and whether sending information from the information source to an external network system is permitted or prohibited, and wherein the one or more processors are configured to:

receive an information transmission request specifying an information type of first information from a first system of an information source;

determine whether sending the first information to outside a network system the first system belongs to is permitted with reference to the permission management information; and select a monitoring/analysis server to receive the first information from the plurality of monitoring/analysis servers based on the determination; and wherein the one or more storage devices store:

information recipient management information associating each of the plurality of systems to be monitored with a monitoring/analysis server of a potential recipient of information on the system; and expected threshold exceedance pattern management information including patterns each composed of a plurality of conditional elements under which usage of a computer resource of a monitoring/analysis server is predicted to exceed a threshold, wherein the plurality of conditional elements include a condition on usage of a computer resource of a monitoring/analysis server, and wherein the one or more processors are configured to:

select a monitoring/analysis server as a primary potential recipient of information generated in the first system with reference to the information recipient management table; and select another monitoring/analysis server as another potential recipient from a plurality of remaining monitoring/analysis servers based on usage of computer resources of the plurality of remaining monitoring/analysis servers in a case where a status of the monitoring/analysis server of the primary potential recipient matches a pattern provided in the expected threshold exceedance pattern management information.

10. A method for a computer system configured to manage a plurality of systems to be monitored that belong to a plurality of networks and a plurality of monitoring/analysis servers that belong to the plurality of networks, the plurality of monitoring/analysis servers being configured to monitor or analyze the plurality of systems, the computer system storing permission management information specifying relations between combinations of an information source and an information type and whether sending information from the information source to an external network system is permitted or prohibited, the method comprising:

receiving, by the computer system, an information transmission request specifying an information type of first information from a first system of an information source;

determining, by the computer system, whether sending the first information to outside a network system the first system belongs to is permitted with reference to the permission management information; and selecting, by the computer system, a monitoring/analysis server to receive the first information from the plurality of monitoring/analysis servers based on the determination, and storing by one or more storage devices:

information recipient management information associating each of the plurality of systems to be monitored with a monitoring/analysis server of a potential recipient of information on the system; and resource usage threshold management information managing thresholds for usage of computer resources of the plurality of monitoring/analysis servers, and selecting a monitoring/analysis server as a primary potential recipient of information generated in the first system with reference to the information recipient management information; and selecting another monitoring/analysis server as another potential recipient from a plurality of remaining monitoring/analysis servers based on usage of computer resources of the plurality of remaining monitoring/analysis servers in a case where usage of a computer resource of the monitoring/analysis server of the primary potential recipient is higher than a threshold specified in the resource usage threshold management information.

* * * * *